3,085,896
METHOD OF MAKING FOAMED POLY-URETHANES
Norman G. Britt, Westport, Conn., Loy S. Engle, Harrington Park, N.J., and Felix P. Carroll, Brooklyn, and Morris Blumberg, Flushing, N.Y., assignors to Interchemical Corporation, New York, N.Y., a corporation of Ohio
No Drawing. Filed Feb. 10, 1958, Ser. No. 714,017
5 Claims. (Cl. 117—33)

This invention relates to a novel process of producing foamed polyurethanes and to novel articles of manufacture prepared thereby. More particularly, it relates to a novel means of producing relatively thin layers of foamed polyurethanes. By the method of this invention it is possible to prepare in situ films or thin layers of polyurethane foam integrally bonded to substrates such as cloth, paper, wood, rubber, metal, or plastic; the thickness of the foam layers produced according to our invention is subject to precise control, so as to produce layers as thick as one inch or as thin as $\frac{1}{32}$ inch.

The art of producing polyurethane foams in bulk is by now highly developed, but satisfactory means are not provided in the prior art for producing relatively thin layers of foam integrally bonded to a substrate. Accordingly, the use of polyurethane foams in thin layers for cushioning, thermal insulation, sound absorption, and garment making has been hindered. In those instances in which thin layers of polyurethane foams have been used in such applications, the foam has been prepared in bulk and then slit mechanically into sheets of the desired thickness and then cemented, tacked, or stitched to the desired substrate material. This involves a number of disadvantages, all of which are overcome by the process of the instant invention: the slitting of bulk-produced foam is a comparatively expensive mechanical operation and ordinarily results in considerable waste of foam material; slit foams, having no support from a surface skin, tend to lack strength and tear-resistance especially in the case of thin layers; the bonding of slit layers to a substrate is expensive in material and labor.

Conventional, or bulk, polyurethane foams are made, generally speaking, by either of two general methods, sometimes designated as the one-step ("one-shot") and two-step ("prepolymer") methods. In the one-step method, an intimate mixture is prepared of an organic diisocyanate (which may contain a small portion of a triisocyanate), a high-molecular weight polyhydroxy compound, water, and a catalyst. In the two-step method, the organic diisocyanate and the high-molecular weight polyhydroxy compound are first reacted together to form a prepolymer; then the prepolymer is intimately mixed with water and catalyst, from which point the two processes are essentially the same. Relative amounts of diisocyanate, high-molecular weight polyhydroxy compound, and water are selected so that there will be considerably more than enough isocyanate to react with all the hydroxyl groups supplied by high-molecular weight polyhydroxy compound, and an amount of water substantially equal to the amount stoichiometrically required to react with the isocyanate groups in excess of those equivalent to said hydroxyl groups of the high-molecular weight polyhydroxyl compound. In both the one-step and two-step variants of the conventional bulk-foaming processes, foaming and expansion begin almost immediately on mixing, and it is essential to discharge the mixture immediately into the space or cavity where foaming is to be completed and curing or setting of the foam is to occur.

The conventional processes, as just described, allow essentially no time in which the effluent from the mixer can be worked, shaped, or moved about before foaming, cross-linking, and solidification occur. Once mixed, the material must be discharged at once; a number of ingenious devices have been developed for effecting quick mixing and relatively uniform distribution of the foaming mixture in a mold, but the lack of working time has prevented the full development of the applications of polyurethane foams to the surface coatings field.

By our invention, the working time available in which the reactive foam-forming mixture may be worked, distributed, shaped, redistributed, doctored, etc., is extended from essentially zero to as much as two or three minutes or more.

(The concept of working time is a very useful one in connection with polyurethane foam production, but a very difficult one to define precisely. Loosely, we use it to indicate the period of time between completion of intimate mixing to the development of such viscosity, shearing-resistance, body, tackiness and adhesion as to make the foaming mixture no longer capable of being pumped, stirred, shaped, spread, or doctored. In conventional foaming compositions, the working time is extremely short, usually less than one second; in our process, as stated above, it can be extended to as much as several minutes.)

Because of the short working time allowable in conventional processes, it is customary to locate the mixer directly over the mold and to discharge the already-foaming mixture directly into the mold. By our process, the mixer may be located many feet from the discharge point, and the foamable mixture may be pumped through ordinary pipe or flexible hose. This represents a great improvement over the prior art methods.

The prior art stresses the importance of avoiding any substantial excess of water over the stoichiometric requirement in the preparation of polyurethane foams. Surprisingly, we have found that great advantages result, under certain conditions hereinafter fully set forth, when we greatly increase the amount of water phase beyond the stoichiometric amount. We have not been able, as yet, to develop a wholly satisfactory explanation for the beneficial results which we obtain by use of a large excess of water, but believe that the improvement is due in large part to a temperature-stabilizing effect of the water on the reaction. We have observed that in preparing foams by conventional means, much heat is evolved. In our process heat is also evolved, but the presence of liquid water (initially at room temperature or below) in intimate contact and heat-exchange relationship with the organic reactants prevents a rapid temperature rise and so either slows down or entirely prevents the exothermic self-sustaining chain reactions which appear to characterize conventional schemes for the preparation of polyurethane foams.

In early experimentation on preparation of polyurethane foams in the presence of varying amounts of water, it was observed that as the ratio of hydrophobic prepolymer to water (henceforth referred to, for sake of brevity, as the oil:water ratio) is reduced from about 50:1 (conventional practice) to about 5:1, the appearance of the foam changed very little, but there were found gradual changes in foam properties such as compression strength, compression set, and humid aging which resulted in somewhat less desirable foams; at ratios lower than 4:1, the character of the reaction products changed drastically: instead of uniformly fine-celled, tear-resistant products, we obtained irregular, coarse-celled, stringy materials with greatly diminished tear-resistance. Having noticed, however, that the decrease of the oil:water ratio resulted in increased working time, we were anxious to take advantage of this effect in the production of foams having the generally desirable qualities of bulk foams produced at the conventional 50:1 oil:water ratio. As a result of much experimentation, we found, surprisingly, that by incorporation of a thickening agent into the water-phase, we could effect great improvements in the resulting foams. Here again we are unable to explain with certainty just how the thickener helps in the preparation of uniform, strong, light foams, but believe that several factors may be involved. For example, we believe that use of a thickened water phase speeds up the uniform mixing of phases and results in actually finer particles of the disperse phase. Furthermore, since the breaking of any emulsion or dispersion must involve the migration of disperse phase droplets and consequent distortion or flow of at least one phase, any increase in either yield value or viscosity of either phase should result in a more stable emulsion or dispersion. In any event, we found that by thickening the water phase employed in our foaming process, we could obtain excellent results at oil:water ratios from about 4:1 to as low as 1:3.

We were not surprised, of course, to find very impressive differences between the behavior of 5:1 oil:water mixtures and 1:3 mixtures. In the former, the oil forms the continuous phase and as a result the mixtures exhibit (initially, of course) flow characteristics similar to those of the oil phase itself. In the 1:3 oil:water mixtures, the water has become the continuous phase, and the flow characteristics are entirely different. If a water phase thickened to our preferred extent is used at this 1:3 ratio, the mixture shows substantially no flow under the influence of gravity, and has a consistency like that of mayonnaise. The phase inversion usually occurs somewhere between the 1:1 ratio and the 1:2 ratio.

The emulsions employed in the invention, whether of oil:water ratio of 5:1 or even 1:3 are obviously quite difficult to study on account of their great chemical reactivity which renders the question of their physical stability moot. We believe that it is the intimate admixture of phases which are prevented, by means of the thickener employed, from separating before the cross-linking and foaming reactions have been well commenced, which accounts for the excellent properties of our foams.

Although the foregoing discussion of our novel foam-producing process and most of the description which follows is limited to the so called two-step process, in which a "prepolymer" is first prepared by reaction of a high-molecular weight hydroxyl compound with an organic di-(or poly-)isocyanate and in which the so-produced "prepolymer" is then caused to react with water to produce the foamed polyurethane, we wish it to be understood that the general principles underlying our invention may also be applied to the so-called "one-step" process in which the high-molecular weight hydroxyl-containing compound, the organic di- or polyisocyanate and water are simultaneously mixed and allowed to react together to produce the foamed polyurethane.

The one-step process, however, in comparison to the two-step process, presents additional difficulties in the metering of three instead of two reactants to the mixer, and also appears to require more mixing time to achieve comparable foams. Furthermore, the totality of reactions involved in the one-step process is strongly exothermic, and this increases control difficulties. By conducting the "prepolymer" formation, which is also highly exothermic, separately, we naturally reduce the amount of heat released in the foam-forming step, which means that control is much easier. An additional advantage of the "prepolymer" method over the "one-shot" method is found in the substantial reduction of toxicity hazards which the former provides; because part of the isocyanate molecules are chemically attached to the high-molecular weight hydroxyl compound in the "prepolymer" and the rest of them are dissolved in the polymer, the vaporization and loss of isocyanates during the foam-forming step is reduced. This reduces atmospheric contamination in the vicinity of foaming operation.

Any of a wide variety of organic isocyanates may be used in the process of our invention. In general, it may be said that almost any organic di- or poly-isocyanate may be employed. Examples of isocyanates suitable for use in our invention include hexamethylene diisocyanate, octamethylene diisocyanate, m- and p-phenylene diisocyanates, 2,4- and 2,6-tolylene diisocyanates, methylene-bis-phenyl isocyanate, and mixtures of one or more of these.

Because the aromatic isocyanates are generally considerably less toxic than the aliphatic isocyanates, we ordinarily prefer to employ them. The isocyanate component used in our invention for "one-shot" foaming or for prepolymer preparation may be exclusively diisocyanate, or may consist of diisocyanate admixed with up to five to ten percent of a triisocyanate to give additional branching and/or cross-linking. The employment of a few percent of a triisocyanate is especially desirable in the preparation of prepolymers from polyalkylene glycols, since this results in prepolymers of higher viscosity than is ordinarily obtained if diisocyanates are used exclusively. Benzene triisocyanate and triphenylmethane triisocyanate may be mentioned as suitable for these purposes. In special instances when increased flame-resistance is desired for the foam, we may use halogenated aromatic diisocyanates, such as dichloro-m-phenylene diisocyanate, dibromo-m-phenylene diisocyanate, trichloro-m-phenylene diisocyanate, etc., as part of the isocyanate component.

Because of its lower cost, low toxicity, and ease of handling, we generally prefer to employ the commercially available approximately 4:1 mixture of 2,4-tolylene diisocyanate and 2,6-tolylene diisocyanate, often referred to in the trade as 80–20 TDI.

It is essential that the high-molecular weight hydroxyl compounds used in the process of our invention be hydrophobic. As used herein, the term "hydrophobic" is intended to designate materials which are substantially water-insoluble and not readily dispersible in water.

In the practice of our invention any of a large number of hydrophobic high-molecular weight polyhydroxy compounds may be used. In general, it may be stated that the hydrophobic high-molecular weight polyhydroxy compounds customarily employed in conventional foam production can also be employed in our process. In general, the polyesters prepared by esterifying together one or more di- or polybasic acids with one or more di- or polyhydric alcohols constitute a preferred class of hydrophobic high-molecular weight poly-hydroxy compounds for use in our invention. It is preferred that such polyesters have acid values of less than 5, most preferably less than about 1. The preparation of such polyesters is a well developed art, and we will not here attempt to discuss it more than very briefly. Among di- and polybasic acids suitable for use in the preparation of polyesters for use in our invention are the benzene polycarboxylic acids including phthalic acid, isophthalic acid, and terephthalic acid and trimesic acid, adipic acid, glutaric acid, succinic acid, sebacic acid, suberic acid, alkenyl succinic acids, maleic acid, maleic acid-rosin adducts, and the corresponding halogenated acids. In many instances the corresponding anhydrides may be employed with equally satisfactory results.

Those polyhydric and dihydric alcohol compounds which are suitable for use in the preparation of polyesters satisfactory for use in the practice of our invention include ethylene glycol, diethylene glycol, polyethylene glycol, di-propylene glycol, polypropylene glycol, propylene gycol, glyderol, trimethylol ethane, trimethylol propane, penta-erythritol, and dipentaerythritol. Also suitable for use as hydroxyl compounds in the preparation of polyesters for use in the process of our invention are hydroxy esters such as castor oil and the mononglyderides of fatty acids.

Polyesters for use as the hydrophobic high-molecular weight polyhydroxyl compounds in our invention preferably have a molecular weight of at least 1100, with acid number below about 5, and with hydroxyl number between about 40 and about 120 preferably 50–75. Polyethers may also be employed as the high-molecular weight hydroxyl containing material, provided they are sufficiently hydrophobic. Polypropylene glycol having a molecular weight of at least about 2000 is satisfactory. Polyethylene glycols, being extremely hydrophilic, have proven completely unsuitable. However, hydrophobic polyglycols containing both oxyethylene and oxypropylene radicals in the chain and prepared by either simultaneous or successive reaction of both ethylene oxide and propylene oxide with either ethylene glycol or propylene glycol may be employed; if the oxyethylene units comprise as much as about 10% of the oxyalkylene units in the polyglycol chains, the polyglycol is unsuitable.

The hydrophobic high-molecular weight hydroxyl-containing material used in the process of our invention may be completely linear, but should preferably be at least slightly branched. In the case of polyesters, this is most easily accomplished by employing a small amount of a triol in the polyester preparation. Suitably branched polyethers may be produced by preparing propylene oxide adducts of triols such as glycerol, trimethylol ethane, hexanetriol, triethanolamine, etc.

The preparation of the foamable "prepolymer" to be used in the practice of our invention is essentially very simple. We ordinarily merely add the organic isocyanate gradually with good agitation to the hydrophobic high-molecular weight hydroxy-containing material, taking care that the reaction mixture does not become overheated. If desired, the hydrophobic high-molecular weight hydroxyl containing material may be warmed somewhat to initiate reaction; in some cases it may also be advisable to employ external cooling to prevent too great a temperature rise during the reaction. Temperatures up to about 100° C. are ordinarily satisfactory, but in some cases heating to as high as 150° C. gives more completely reacted products.

Instead of preparing the prepolymer by reacting a single hydrophobic high-molecular weight hydroxyl-containing product with a polyisocyanate, e.g., a diisocyanate, we may use the diisocyanate to link several polyhydroxyl compounds together to form the prepolymer. For example, we may react a hydrophobic polyalkylene glycol with more than an equivalent amount of diisocyanate and then react the so formed prepolymer with a polyhydric alcohol such as glycerol, trimethylol ethane, trimethylol propane, pentaerythritol, etc., to produce a more highly branched prepolymer. We usually then react the resulting complex with additional diisocyanate to produce the final prepolymer for foam production. In some cases, when we desire to increase the molecular weight of the prepolymer without increasing the branching, we may substitute a dihydric alcohol, such as ethylene glycol or propylene glycol, for the polyhydric alcohols above mentioned.

In some instances it is desirable to incorporate catalytic amounts of an oil-soluble tertiary amine into the foamable prepolymer during its preparation in order to promote the reactions which result in cross-linking and foaming when finally mixed with water.

As is well-known in the polyurethane foam art, it is important to use enough isocyanate so that considerable excess of isocyanate groups remains after reaction of all (or substantially all) of the hydroxyl groups of the hydrophobic high-molecular weight hydroxyl-containing material to form urethane-type linkages. In most cases we prefer that the prepolymer contain about 14% by weight of unreacted isocyanate groups, though satisfactory foams can be made by the process of our invention from prepolymers containing as little as 5% or as much as 20% unreacted isocyanate radicals. In general, an increase in the isocyanate content of the prepolymer tends to result in foams of lower density and greater strength, whereas a reduction of isocyanate content of the prepolymer tends to give denser and softer foams.

For the efficient production of isocyanate foams by our process, a basic catalyst of some sort is ordinarily used. A great number of catalysts are known which will promote the chain-lengthening, cross-linking, and foaming reactions involved, in the formation of polyurethane foams. We prefer to employ a tertiary amine catalyst. Among suitable tertiary amine catalysts may be mentioned triethyl amine, triamyl amine, N-methyl morpholine, N-cyclohexyl piperidine, N,N'-diethyl piperazine, α-methyl-benzyl dimethyl amine, lauryl dimethyl amine, and diethyl ethanolamine. Instead of a tertiary amine catalyst, we may employ an inorganic alkali, such as sodium hydroxide, sodium carbonate, or trisodium phosphate as catalyst. (It is to be noted that strong bases, such as sodium hydroxide, can not be used as catalysts in the prior art polyurethane foam-producing processes, because they cause explosively violent reaction of the isocyanate with active-hydrogen compounds.) However, these inorganic catalysts, since they are extremely energetic, lead to more control difficulties, even in our process. Furthermore, while the amine catalysts are volatile enough not to leave any objectionable residue in the finished foam, an inorganic alkali catalyst would remain in the foamed product unless special measures be taken to neutralize or leach it out. The organic catalyst may be dissolved in either the aqueous or the organic phase; naturally, some of these amines are preferentially soluble in one or the other of the phases, and these differences are taken into account in the selection of a catalyst. When we wish to dissolve the catalyst in the aqueous phase, we use an amine which is readily soluble in water, such as N-methyl morpholine, diethyl ethanolamine, etc.; when we wish to employ the catalyst as dissolved in the non-aqueous phase, we use a preferentially oil soluble amine, such as α-methylbenzyl dimethylamine or lauryl dimethyl amine. We may use two different catalysts simultaneously, one in each phase. Recently there have come onto the market several proprietary products (such as RCD 2091, marketed by E. I. du Pont de Nemours and Company) which are described as delayed-action catalysts and which do indeed delay the onset of the foaming reactions in urethane foam production. These catalysts appear to be amine adducts of some sort in which the catalytically active amine is partially protected or bound up in some combination which is stable at room temperature but which releases the amine when heated. These materials may also be used in the process of our invention, though relatively little, if any, special advantage results from their use in our process. In our experience, such delayed action catalysts extend the working time in a conventional foaming process by only a few seconds, and are not capable of extending the working time to such an extent as to permit the degree of shaping, smoothing, leveling, distribuuting and redistributing of the unfoamed foamable emulsion which our invention makes possible.

In the case of our preferred catalysts, the tertiary amines, catalyst concentration is not particularly critical; between one and three percent by weight of the prepolymer is generally a satisfactory amount, with two percent usually preferred.

As pointed out above, we have found that by employing a thickening agent in the aqueous phase, very much better foams can be produced; in fact at oil-water ratios of 4 or less we find it imperative to employ a thickening agent. The use of a thickening agent in the water phase is accordingly an essential part of our invention. A wide variety of thickening agents have been tested and found to be operative in our invention. Among thickening agents found to be satisfactory in the practice of our invention are ammonium, sodium, and potassium alginates, ammonium, sodium, and potassium polyacrylates and polymethacrylates, methyl cellulose, hydroxyethyl cellulose, carboxymethyl cellulose, and sodium starch glycolate, and locust bean gum.

The most satisfactory thickening agent we have found for the water phase in our foaming process is a copolymer of about 100 parts of acrylic acid and about 1 to 2 parts of octa-allyl sucrose, sold by the Goodrich Chemical Company under the designation Goodrite Carbopol K-934. This is used at a concentration of about 2% solids, and adjusted to a pH of about 8.0-9.5, preferably with ammonium hydroxide.

The preparation of polyurethane foams by our process is simple. Prepolymer as described above is mixed quickly with between about one-fifth and three times its weight of water containing thickener and catalyst. A thick creamy emulsion results which is stable enough to be sprayed, spread, poured into cavity molds, etc. Liquid films of such emulsions can be laid down by spraying, and, if desired, may be spread with a smoothing bar, doctor blade, or other smoothing device to form a very uniform wet film of any desired thickness between about 0.005 inch and about two inches. These emulsions are capable of reacting, with great increase of volume, to form strong, low-density, resilient foams having strong, abrasion-resistant surface skins.

Foaming will commence at room temperature a short time after preparation and distribution of the foamable emulsion, the time interval depending on such factors as prepolymer compositions, oil:water ratio, etc. Foaming can ordinarily be accelerated by heating, though in some cases it is advantageous to allow foaming to proceed at room temperature for a few minutes before heating. At oil-water ratios as low as 1:1, the best foams are obtained by subjecting the foamable emulsion to heating as soon as possible and before substantial foaming has occurred, but very satisfactory results are obtained if heat is applied within 60-90 seconds after the emulsion is spread or distributed. When working at a 4:1 oil-water ratio it is usually preferable to allow foaming to proceed at ambient temperature and then to apply heat to the fully expanded foam about 10 minutes after mixing and distributing the emulsion.

It will be seen that in some cases we employ heat to initiate the foaming reaction; in all cases we prefer to employ heat to accelerate the curing of foams once they are formed. The heat for foaming and curing may be applied in any of several ways. We may simply expose the foamed or unfoamed emulsion to convection heating in an ordinary hot-air oven in which the air temperature is preferably between about 200° F. and 350° F., or we may initiate foaming and/or curing by means of electrical resistance infra red heaters. Excellent foams with desirably soft-feeding surface skins are obtained when the foaming of a 1:1 emulsion is initiated by contacting it with open steam.

A very important embodiment of our invention comprises the preparation of cloth having a uniform polyurethane foam integrally bonded thereto. In this embodiment of our invention we prepare the foamable emulsion continuously by metering prepolymer and thickened water-phase continuously into a mixing chamber (preferably at an approximately 1:1 ratio) and apply the resulting emulsion by spraying or flowing it onto a traveling web of the cloth to be coated. The emulsion-coated cloth is caused to pass over a roller or other supporting means and under a doctor blade which spreads the said emulsion into a layer of uniform film-thickness of, say about 0.025 inch. After doctoring, the emulsion-coated cloth is passed through a heating zone to expand the liquid film into foam and cure the resulting foam. We heat with steam or radiant heat as soon as possible, preferably within about 90 seconds after doctoring. Curing of the foam is accomplished by convection heating at 200-350° F. air temperature for one to two hours. Mixing, pumping, and web-travel rates are adjusted so that from time of mixing to doctoring occupies no more than about three minutes. Cloth emerging from the oven is coated with a flexible, resilient polyurethane foam having a thickness about 8-12 times that of the doctored liquid film. This foam is firmly adherent to the cloth substrate and has a tough, abrasion resistant somewhat porous skin on the exposed surface. It is suitable for use as a rug underlay, for thermal insulation, or for sound absorption.

As pointed out above, the foams of the present invention have a relatively tough, somewhat porous, abrasion-resistant skin on their exposed surfaces. After the formation of the foam before it has become completely cured, this surface film is extremly sticky or tacky. While at this stage of partial cure and in this tacky condition, the foams of this invention may be readily flocked by blowing or sifting on to them any desired flock material, such as 2 mm. lengths of dyed artificial silk fibers. There is thus produced a novel and valuable article of manufacture comprising a flocked polyurethane foam valuable for novelties, for lining jewel boxes, instrument cases, and for use as weather-stripping and as sealant strips for automobile doors.

Although we ordinarily try to provide uniform curing of our foams, and therefore endeavor to apply the curing oven heat in a completely uniform manner so as to get foams with a uniform surface and thickness, we have found that by deliberately varying the curing heat we can produce interesting valuable, and novel embossed surfaces. This is especially effective when curing is accomplished by radiant heating, e.g., by infra red sources. In such cases, we can irridiate the foamable emulsion film through a stencil constructed of sheet material which is at least partially opaque to heat rays. By proper choice of emulsion composition and curing schedule we can obtain either depressed areas or raised areas under the stencil openings. In the case of foamable emulsions containing 50% or more water-phase, we ordinarily find that application of extra heat to localized areas causes additional foaming so that the areas exposed through the stencil will be raised; on the other hand, in the case of foamable emulsion containing less than about 35% water-phase, we find that by heating within about 3 minutes after initial mixing, we cause a partial collapse of the foam which results ultimately in a depressed area. Obviously, a certain amount of experimentation and testing is necessary before fixing on the compositions and cure schedules for a given desired effect.

Instead of coating on cloth, we may by minor changes in operating procedure, prepare similar foam coatings on metal, wood, fiber board, paper, composition board, cellophane, rubber, and plastic sheeting including polyvinyl chloride, Mylar, polyethylene, polypropylene, etc. If coated on a casting belt from which it can be readily stripped, the foam is found to have a characteristically tough, porous, abrasion-resistant film on both its upper and lower surfaces.

The tough and somewhat porous surface skins on the foams produced by the process of our invention result in a number of advantages over thin bodies of foam slit from slabs of conventionally produced bulk foam. For example, thin films of flexible lacquer, enamel, varnish, plastisol, organisol, or inks may be applied to the surface skin to produce decorative effects not possible with the fragile open-celled faces of bodies of slit foams.

Valuable upholstery materials may be made by coating the back surface of decorated or undecorated vinyl sheeting with polyurethane foams by our novel process. The tough undercoating thus produced, in addition to its cushioning value, also greatly reduces the tendency of vinyl sheets to "cut-growth."

The following examples will serve to illustrate the practice of our invention, without, however, limiting its scope.

POLYESTER PREPARATION

Example 1

Thirty-six parts of diethylene glycol and forty-six parts of adipic acid are heated together at about 230° C. under an atmosphere of carbon dioxide until the acid value falls to about 20 (about four hours). Two parts of trimethylol ethane are then added, and the mixture is stirred for about eight hours. The product has an acid value of 0.88, a hydroxyl value of 53.8, a viscosity (cone and plate) of 114 poises at 30° C., and contains 0.001% water.

Example 2

Another polyester is made from the same ingredients and by the same procedure as in Example 1. In this case, the product has an acid value of 1.68, a hydroxyl value of 63.1, a viscosity of 114 poises, and a water content of 0.06.

Example 3

A mixture of 107 parts of diethylene glycol, 21.4 parts of polyethylene glycol (average molecular weight 200), and 202.2 parts of sebacic acid is heated with agitation under an atmosphere of carbon dioxide for one hour. The temperature is then raised to 225° C. until the acid number is 16-18. Then 5.1 parts of trimethylolethane is added and heating continued until the acid value is 3.8. The hydroxyl value is 70.6, and the water content 0.10%. This polyester is a solid at room temperature.

Example 4

A polyester is prepared as in Example 3 from 1448.2 parts of diethylene glycol, 1899.3 parts of adipic acid, and 51.0 parts of glycerol. The product has an acid value of 3.4, a hydroxyl value of 53.9, a water content of 0.11%, and a viscosity of about 125 poises.

Example 5

A polyester is prepared as in Example 3 from 101.9 parts of diethylene glycol, 20.4 parts of polyethylene glycol of molecular weight 200, 202.2 parts of sebacic acid, and 4.0 parts of glycerol. The product is solid at room temperature, has an acid value of 3.4, a hydroxyl value of 83.3, and a water content of 0.13%.

PREPOLYMER PREPARATION

Example 6

Seventy-five parts of the polyester of Example 1 are blended with twenty-five parts of 80-20 TDI (mixture of approximately 80% 2,4-tolylene diisocyanate and 20% 2,6-tolylene diisocyanate.) The mixture is stirred for 5 minutes during which time the temperature rises about 10° C. There is then added 0.025 part of Pluronic L 64 (a polyalkylene glycol of average molecular weight about 3000 and containing about 60% oxypropylene residues and about 40% oxyethylene residues), and stirring is continued for 10 minutes. The resulting prepolymer has a viscosity of about 140 poises, and is allowed to stand 24 hours before use. It contains about 9% by weight available isocyanate.

Example 7

Sixty-seven parts of the polyester of Example 1, 33 parts of 80-20 TDI, and 0.025 part of Pluronic L 64 are blended and reacted as described in Example 6. The product contains about 13% isocyanate radicals, and has a viscosity of about 70-80 poises.

Example 8

Two hundred parts of the polyester of Example 3 are placed in a flask provided with a stirrer and contained in a water bath. Under an atmosphere of carbon dioxide, and with good agitation, 116.8 parts of 80-20 TDI are added rapidly. Stirring is continued for 30 minutes, keeping the temperature at 25° C. The product has a viscosity of about 23 poises and contains about 14% available NCO.

Example 9

Eighty-eight parts of 80-20 TDI are heated with stirring to 50° C. under an atmosphere of carbon dioxide. Then 250 parts of the polyester of Example 4 (at 50° C.) are added rapidly. Stirring is continued at 50° C. for thirty minutes, after which the mixture is cooled to room temperature. This prepolymer has a viscosity of about 150 poises at 30° C., and contains about 9% available NCO.

Example 10

Two hundred parts of the polyester of Example 5 are placed in a flask and stirred at 25° C. under an atmosphere of carbon dioxide; 123.6 parts of 80-20 TDI are then added rapidly, and, with the temperature maintained at 25° C., stirring is continued for 30 minutes. This prepolymer has a viscosity of approximately 150 poises and contains about 14% available NCO.

Example 11

Sixty-five parts of Paraplex U-148, 35 parts of 80-20 TDI, and 0.025 part of Pluronic L 64 are blended and reacted together as in Example 11. The resulting prepolymer has a viscosity of about 50-60 poises, and contains about 13% available isocyanate.

The Paraplex U-148 employed in this example is a polyester marketed by Rohm & Haas Co., Philadelphia, Pennsylvania. It has an acid number of 3.0, a hydroxyl number of 70, and a viscosity of about 80-100 poises.

Example 12

Sixty-one parts of polypropylene glycol (having an average molecular weight of about 2000) and 15 parts of 80-20 TDI are blended together and heated to 120° C. for two hours; 2.7 parts of trimethylolpropane are stirred in and the temperature is held at 120° C. for ½ hour. 21 parts more of 80-20 TDI are then added; after 1 more hour at 120° C., the mixture is allowed to cool to room temperature, and 0.25 part of DC 200 silicone oil is added. The prepolymer thus obtained has a viscosity of about 160 poises, and contains about 12% available isocyanate.

The DC 200 silicone oil employed in this example is a product of Dow-Corning Co., Midland, Michigan. It has a viscosity of 50 centipoises, and has been stated to consist of chains of dimethyl siloxane units.

Example 13

Forty-three parts of 3,3'-bi-tolylene-4,4'-diisocyanate are stirred into 57 parts of the polyester of Example 2. The temperature rises to about 140° F. due to the heat of reaction. Heat is then applied to raise the temperature to 175° F., and the mixture is stirred at this temperature for one hour and then cooled to room temperature. This prepolymer is extremely viscous white opaque liquid of about 500 poises viscosity, and contains about 12% available isocyanate.

Example 14

Forty-three and one-half parts of 4,4'-diphenyl methane diisocyanate are stirred into fifty-six and one-half parts of the polyester of Example 2. The exothermic reaction which occurs raises the temperature to about 140° F. The mixture is then heated with stirring to about 175° F. and kept at this temperature for one hour; it is then cooled to room temperature. This prepolymer is a white, opaque solid and contains about 13% available isocyanate.

Example 15

Sixty-seven parts of the polyester of Example 1 are blended with 33 parts of 80-20 TDI and stirred for five minutes, during which time the temperature rises about 10° C. due to the exothermic reaction. There is then added 0.025 part of Pluronic L 61 (a polyalkylene glycol of molecular weight about 1700–2100 and containing about 10–20% by weight oxyethylene residues and about 80–90% oxypropylene residues), and stirring is continued for another 10 minutes. The resulting prepolymer has a viscosity of about 50 poises and an available isocyanate content of about 13%.

*Example 16*

Seventy parts of the polyester of Example 1 and 30 parts of 80–20 TDI are blended together at room temperature and stirred for five minutes; the heat of reaction raises the temperature 10° C. 0.025 part of Pluronic L 61 is then added and stirring is continued for 10 minutes. This prepolymer has a viscosity of about 140, and contains about 11% available isocyanate.

*Example 17*

Seventy parts of the polyester of Example 2 and 30 parts of 80–20 TDI are blended together at room temperature and stirred for five minutes. The temperature of the mixture rises about 10° C. 0.025 part of Pluronic L 61 is added and stirring is continued for another 5 minutes. 0.5 part of alpha-methylbenzyl dimethylamine are then added, causing the temperature to rise another 30° C.; after stirring for 20 minutes more, the product is cooled to room temperature. This prepolymer has a viscosity of about 140 poises, and contains about 11% available isocyanate.

WATER PHASES

*Example 18*

| | Parts |
|---|---|
| Goodrite Carbopol K 934 (2% water solution) | 100 |
| NH₄OH (29.3% water solution) | 1.1 |
| N-methyl morpholine | 2.0 |

Add the NH₄OH to the Carbopol K 934 solution, and stir until clear and homogeneous. Add the tertiary amine and again stir till homogeneous. The viscosity is about 12 poises.

*Example 19*

| | Parts |
|---|---|
| Goodrite Carbopol K 934 (2% water solution) | 100 |
| NH₄OH (29.3% water solution) | 2.45 |
| N-methyl morpholine | 2.2 |

Mix as in Example 21. The final pH is about 8–9 and the viscosity about 13 poises.

*Example 20*

| | Parts |
|---|---|
| Sodium starch glycollate (2% water solution) | 100 |
| N-methyl morpholine | 2 |

Mix thoroughly for 10 minutes. The pH is about 8–9, and the viscosity about 3 poises. The yield value is about 430 dynes per square centimeter.

*Example 21*

| | Parts |
|---|---|
| Keltex (sodium alginate, 2% water solution) | 100 |
| N-methyl morpholine | 2 |

Mix the two ingredients and stir thoroughly for 10 minutes. The pH is about 8–9, and the viscosity about 2.5 poises. The yield value is less than 75 dynes per square centimeter.

*Example 22*

| | Parts |
|---|---|
| Polyacrylamide (2% water solution) | 100 |
| N-methyl morpholine | 2 |

Mix the two ingredients and stir thoroughly for 10 minutes. The pH is about 8–9, and the viscosity about 2–3 poises.

*Example 23*

| | Parts |
|---|---|
| Ammonium alginate (2% water solution) | 100 |
| N-methyl morpholine | 2 |

Mix well. The pH is about 8–9, and the viscosity about 2–3 poises.

*Example 24*

| | Parts |
|---|---|
| Goodrite Carbopol K 934 (2% water solution) | 100 |
| NH₄OH (29.3% water solution) | 1 |
| NaOH (30% water solution) | 3 |

Mix and stir 10 minutes. The pH is about 8–9, and the viscosity about 13 poises. The yield is about 4000 dynes per square centimeter.

*Example 25*

| | Parts |
|---|---|
| Godrite Carbopol K 934 (2% water solution) | 100 |
| NH₄OH (29.3% water solution) | 1 |
| Alpha-methylbenzyl dimethylamine | 1.65 |

Mix well and stir 10 minutes. The pH is about 9–10, and the viscosity about 12 poises.

*Example 26*

| | Parts |
|---|---|
| Goodrite Carbopol K 934 (2% water solution) | 100 |
| NH₄OH (29.3% water solution) | 1 |
| N,N,N',N'-tetrakis-(2-hydroxyproxyl) ethylene diamine | 2 |

Mix thoroughly and stir for 10 minutes. The pH is about 8–9, and the viscosity about 12 poises.

*Example 27*

| | Parts |
|---|---|
| Goodrite Carbopol K 934 (2% water solution) | 100 |
| NH₄OH (29.3% water solution) | 1 |
| Formaldehyde (40% water solution) | 1 |

Mix all three ingredients together and stir for 10 minutes. The formaldehyde used in this example serves as a catalyst of the cross-linking reactions of the foaming step.

*Example 28*

| | Parts |
|---|---|
| Goodrite Carbopol K 934 (2% water solution) | 100 |
| NH₄OH (29.3% water solution) | 1 |
| RCD–2091: Delayed-action catalyst (an amine-adduct) | 2.5 |

Mix and stir well for 10 minutes. The pH is about 8–9, and the viscosity about 12 poises.

*Example 29*

| | Parts |
|---|---|
| Water | 20 |
| RCD 2091: Delayed-action catalyst (an amine adduct) | 2.5 |
| Pluronic L 61 (an ethylene oxide-propylene oxide condensate of molecular weight about 1700–2100 and containing about 10–20% ethylene oxide residues) | 1.0 |

Dissolve the RCD 2091 in the water and then add the polyglycol. Stir until well mixed. The pH is about 7–9, and the viscosity about 11.8 poises.

*Example 30*

| | Parts |
|---|---|
| Goodrite Carbopol K 934 (2% water solution) | 20 |
| NH₄OH (29.3% water solution) | 0.5 |
| RCD 2091: Delayed action catalyst (an amine adduct) | 2.5 |
| Pluronic L 61 | 1.0 |

Dissolve the ammonia and the RCD 2091 in the Carbopol solution, then add the polyglycol and stir for 10 minutes. The pH is about 8–9 and the viscosity about 11.8 poises. The yield value is about 3600 dynes per square centimeter.

Example 31

| | Parts |
|---|---|
| Goodrite Carbopol K 934 (2% water solution) | 100 |
| NH₄OH (29.3% water solution) | 1.1 |
| N-methyl morpholine | 4.0 |

Mix all ingredients until homogeneous. The pH is about 10 and the viscosity about 14 poises. The yield value is about 4000–5000 dynes per square centimeter.

Example 32

| | Parts |
|---|---|
| Goodrite Carbopol K 934 (2% water solution) | 100 |
| NH₄OH (29.3% water solution) | 1.1 |
| N-methyl morpholine | 0.7 |

Mix all three ingredients until homogeneous. The pH is about 8 and the viscosity about 10–11 poises. The yield value is about 2000–3000 dynes per square centimeter.

Example 33

| | Parts |
|---|---|
| Goodrite Carbopol K 934 (2% water solution) | 100 |
| NH₄OH (29.3% solution) | 2.0 |
| NaOH (30% solution) | 4.0 |

Add the NH₄OH to the Carbopol K 934 solution and stir until thick and clear. Add sodium hydroxide and stir 15 minutes.

Example 34

| | Parts |
|---|---|
| Goodrite Carbopol K 934 (1.5% water solution) | 100 |
| NH₄OH (29.3% solution) | 1.7 |
| N-methyl morpholine | 2.7 |

Add ammonium hydroxide to Carbopol solution and stir until thick and clear. Add N-methyl morpholine and stir 15 minutes.

FOAMING

Example 35

One hundred grams of the prepolymer of Example 6 and one hundred grams of the aqueous phase of Example 18 are mixed for 60 seconds with a high-speed household mixer (Hamilton Beach Model 30). The resulting creamy emulsion is poured into a greased bread pan 3¼ inches deep, 9 inches long, and 4 inches wide. It fills this pan to a depth of about ¼–⅜ inch, and can easily be distributed and smoothed. Four minutes after the start of mixing, the emulsion has begun to evolve $CO_2$ very slowly, but has not increased its volume appreciably. The pan is then placed in an oven at 200° F. Within a few minutes the "batter" rises to a height of about 3 to 4 inches. After three hours the pan is removed from the oven, and allowed to cool. The mass of foamed polyurethane is removed and examined. It is found to have a density of 5 lbs. per cubic foot, a compression strength of 1.8 pounds per square inch, and a compression set of 75%.

Example 36

One hundred grams of the prepolymer of Example 7 and 100 grams of the water phase of Example 19 are treated as described in Example 35, and with similar results except that the product is found to have a density of 3.0 lbs./cu. ft., compression strength of 0.8 pound/sq. inch, and compression set of 80%. Tear strength is determined to be 1.7–3.7 pounds per inch.

Example 37

A blend is made of 110 grams of the prepolymer of Example 8 and 0.11 gram of EL–719 (a polyoxyethylated vegetable oil marketed by Antara Chemicals). Ninety parts of the water phase of Example 33 is now added, and the mixture is blended at room temperature with a high speed (8000 r.p.m.) (Hamilton Beach Model No. 30) household mixer for 35 seconds. The resulting emulsion is poured into a greased aluminum bread pan to a depth of about ⅜" and allowed to stand for one minute. During this time there is only negligible foaming or other evidence of gas evolution, and the mixture remains workable. The pan and its contents are then placed in an oven and heated at 150° F. for two hours. The resulting loaf of foam has a density of 4.1 lbs./cu. ft., a compression strength of 0.8 lb./sq. in., and compression set of 75%.

Example 38

A blend is prepared of 110 grams of the prepolymer of Example 9 and 0.11 gram of Tween 60 (a polyoxyethylene sorbitan monostearate emulsifier marketed by the Atlas Powder Co.) by stirring them together for 5 minutes in a 400 ml. beaker. Ninety parts of the thickened water phase of Example 33 is then added and the two phases are mixed with a high speed household mixer for 35 seconds. The resulting emulsion is poured into a greased aluminum bread pan, filling it to a depth of about ⅜". After standing at room temperature for about one minute, during which time the emulsion remains easily workable without any substantial volume increase, it is placed in a 150° F. oven and baked for two hours. During the first 10 minutes in the oven the emulsion foams up and more than fills the pan. After oven curing, the foam is found to have a density of 7.3 lbs./cu. ft. a compression strength of 2.3 lbs./sq. in., and compression set of 71%.

Example 39

A blend is prepared by stirring together 90 grams of the prepolymer of Example 10 and 0.09 gram of Tween 60. One hundred ten parts of the thickened water phase of Example 34 are then added and the two phases are intimately mixed by stirring for 50 seconds with a high-speed household mixer (Hamilton Beach Model 30). The resulting thick creamy emulsion is poured into a greased bread pan to a depth of about ⅜", and allowed to stand at room temperature for 4 minutes, during which time the emulsion remains easily workable with substantially no foaming or volume increase. The pan is then placed in a 200° F. oven and baked for two hours. During the first few minutes of heating the emulsion foams up to more than fill the pan, and becomes tough and firm. The foam is found to have a density of 2.1 lbs./cu. ft., a compression strength of 0.6 lb./sq. in., and compression set of 98%.

Example 40

One hundred grams of the prepolymer of Example 11 and 100 grams of the thickened water phase of Example 19 are mixed and treated as in Example 35 and with similar results except that the product has a density of 3.5 pounds per cubic foot, compression strength of 1.0 pound per square inch, compression set of 86% and tear strength of 1.5 pounds per inch.

Example 41

One hundred grams of the prepolymer of Example 12 and 100 grams of the thickened aqueous phase of Example 19 are treated as described in Example 35, and with similar results except that the product has a density of 3.2 lbs./sq. ft., compression strength of 1.0 lb./sq. inch, and compression set of 69%.

Example 42

One hundred grams of the prepolymer of Example 13 and 100 grams of the thickened water phase of Example 19 are treated as described in Example 35, and with similar results except that the product is a rigid foam having a density of about 20 lbs./cu. ft.

Example 43

One hundred grams of the prepolymer of Example 14 are liquified by warming to 100° F. and then treated with 100 grams of the thickened water phase of Example 19 as described in Example 35 and with similar results except that the product is a rigid foam having a density of about 15 lbs./cu. ft.

*Example 44*

One hundred grams of the prepolymer of Example 15 and 100 grams of the thickened water phase of Example 20 are treated as described in Example 35 with similar results except that the product is found to have a density of 4.3 lbs./cu. ft., compression strength of 1.2 lbs./sq. in., and compression set of 76%.

*Example 45*

One hundred grams of the prepolymer of Example 15 and 100 grams of the thickened water phase of Example 21 are treated as described in Example 35 and with similar results except that the product is found to have a density of 3.6 lbs./sq. in., and compression set of 52%.

*Example 46*

One hundred grams of the prepolymer of Example 15 and 100 grams of the thickened water phase of Example 22 are treated as described in Example 35 and with similar results except the foam produced has a density of 4.0 lbs./cu. ft., compression strength of 0.8 lb./sq. in., and compression set of 79%.

*Example 47*

One hundred grams of the prepolymer of Example 15 and 100 grams of the thickened water phase of Example 23 are treated as described in Example 35 and with similar results except that the foam produced has a density of 4.1 lbs./cu. ft., a compression strength of 1.1 lbs./sq. in., and a compression set of 78%.

*Example 48*

One hundred grams of the prepolymer of Example 16 and 100 grams of the thickened water phase of Example 24 are treated as in Example 35 and with similar results except that the foam produced has a density of 3.9 lbs./cu. ft., a compression strength of 1.1 lbs./sq. in., and a compression set of 50%.

*Example 49*

One hundred grams of the prepolymer of Example 16 and 100 grams of the thickened water phase of Example 25 are treated as described in Example 35 and with similar results except that the foam produced is found to have a density of 3.4 lbs./cu. ft., a compression strength of 1.0 lbs./sq. in., and compression set of 72%.

*Example 50*

One hundred grams of the prepolymer of Example 16 and 100 grams of the thickened aqueous phase of Example 26 are treated as described in Example 35 and with similar results, except that the foam product has a density of 3.6 lbs./cu. ft., a compression strength of 1.1 lbs./sq. in., and a compression set of 73%.

*Example 51*

One hundred grams of the prepolymer of Example 16 and 100 grams of the thickened water phase of Example 27 are treated as in Example 35 and with similar results except that the product foam has a density of 3.3 lbs./cu. ft., compression strength of 0.75 lb./sq. inch, and a compression set of 70%.

*Example 52*

One hundred grams of the prepolymer of Example 16 and 100 grams of the thickened water phase of Example 28 are treated as described in Example 35 and with similar results except that the product foam is found to have a density of 3.4 lbs./cu. ft., a compression strength of 0.9 lb./sq. in., and a compression set of 65%.

*Example 53*

One hundred sixty-five grams of the prepolymer of Example 16 and 33 grams of the water phase of Example 29 are treated as described in Example 35 except that the emulsion is allowed to stand 10 minutes in the pan before heating in the oven. Foaming commences to be appreciable about four minutes after mixing, but even at this point the mixture can still be worked. Expansion of foam continues in the oven and is substantially complete after 5 minutes in the oven. The product foam is found to have a density of 3.3 lbs./cu. ft., a compression strength of 0.7 lb./sq. in., and compression set of 28%.

*Example 54*

One hundred sixty-five grams of the prepolymer of Example 16 and 33 grams of the thickened water phase of Example 30 are treated as specified in Example 53 and with quite similar results except that the foam product is found to have a density of 2.6 lbs./cu. ft., a compression strength of 0.6 lb./sq. in., and a compression set of 40%.

*Example 55*

One hundred sixty-five grams of the prepolymer of Example 17 and 33 grams of the thickened water phase of Example 30 are treated as specified in Example 53 and with similar results, except that the product foam is found to have a density of 2.4 lbs./cu. ft., a compression strength of 0.4 lb./sq. in., and a compression set of 35%.

*Example 56*

One hundred thirty-three grams of the prepolymer of Example 15 and sixty-seven parts of the thickened water phase of Example 31 are mixed with a high-speed household mixer (Hamilton Beach Model No. 30) for 36 seconds, and then poured out into a greased bread pan. For about a minute and a half the emulsion can be spread, smoothed, distributed, etc. One minute after mixing and pouring, the emulsion can be seen to be expanding, and five minutes after mixing expansion is nearly complete. The foam is now placed in a 200° F. oven and baked for three hours. The product foam is found to have a density of 3.0 lbs./cu. ft., compression strength 0.9 lb./sq. in., and a compression set of 80%.

*Example 57*

One hundred grams of the prepolymer of Example 17 and 100 grams of the thickened water phase of Example 19 are treated as described in Example 35 and with similar results except that the foamed product is found to have a density of 2.9 lbs./cu. ft., a compression strength of 0.8 lb./sq. in., and a compression set of 73%.

*Example 58*

One hundred grams of the prepolymer of Example 17 and 100 grams of the thickened aqueous phase of Example 19 are treated as described in Example 35 and with similar results except that after three minutes at room temperature, heating is for one hour in a 200° F. oven and then two hours in a 350° F. oven. The product foam has a density of 2.9 lbs./cu. ft., a compression strength of 0.8 lb./sq. in., and a compression set of only 24%.

*Example 59*

Fifty grams of the prepolymer of Example 15 and 150 grams of the thickened water phase of Example 32 are mixed for 36 seconds with a high-speed household mixer (Hamilton Beach Model No. 30). The resulting emulsion is very thixotropic, and is spread out in a greased bread pan and allowed to stand at room temperature for five minutes, during which time it remains easily workable, without appreciable expansion due to gas formation. At the end of five minutes, the pan is placed in a 200° F. oven and the mixture is baked for three hours. Full expansion occurs in the first 15 minutes of baking. The product foam has a density of 4.9 lbs./cu. ft., and a compression strength of 1.5 lbs./sq. in., and a compression set of 84%.

Example 60
COATING CLOTH BY BATCH METHOD

One hundred grams of the prepolymer of Example 6 and 100 parts of the thickened water phase of Example 18 are mixed for 60 seconds by means of a high-speed kitchen mixer (Hamilton Beach Model No. 30) operating at about 800 r.p.m. The emulsion is then poured on the coating platform of a laboratory coating machine, known as the Martinson Laboratory Coating Machine, manufactured by the Martinson Machine Company of Kalamazoo, Michigan. A piece of 80 x 80 mesh count cotton fabric has been previously attached to the coating platform, and the metering bar has been adjusted to a clearance to produce a uniform coating of emulsion 0.041 inch thick on the substrate. The coating platform and fabric are then moved under the metering bar at a rate of 2 feet per minute. The coated fabric is then placed on a tension frame, and after about two minutes the frame and coated fabric are placed under a 660 w. unidirectional radiant heat source equipped with a reflector of approximately one square foot area. The heat source is five inches above the fabric. After five minutes in the radiant heat zone, the emulsion has expanded fully into a uniform foam coating, and the frame, with fabric still attached, is transferred to an electrically heated convection oven operating at 330° F. for an additional 55 minutes. The fabric is found to be coated with a foam 0.30 inch thick which has a density of 5.1 lbs. per cubic foot. The exposed surface of the foam is covered with a porous but tough and abrasion resistant skin.

Wood, hard board and vinyl and Mylar sheeting have been similarly coated with foam.

Example 61
CONTINUOUS COATING ON FABRIC

In a continuous foam coating operation, the prepolymer used is similar to that of Example 15 except that it contains 0.5% alphamethylbenzyl dimethyl amine as a catalyst, and a thickened water phase as described in Example 18 is used. The two liquids are pumped under pressure of 50 lbs./sq. inch at a rate of about 200 ml./minute each into a mixing chamber of 10 ml. capacity. The thickened water phase is cooled prior to mixing to about 55° F. The mixing chamber is jacketed for cooling with circulating ice-water to maintain an effluent emulsion temperature of 65° F. The mixing chamber contains a turbo type mixer running at a speed of 1,500 to 2,000 r.p.m. Average residence time in the mixer is 1.5 seconds. The emulsion is discharged from the mixer through an air atomizing spray gun at a fluid pressure of 50 lbs./sq. in., and with an atomizing air pressure of 30 lbs./sq. in.

The spray assembly is reciprocated in such a way that the atomized emulsion is uniformly distributed over a total width of 48" of cotton fabric which is being passed, under tension, beneath the spray gun at a linear speed of 18 inches per minute.

Forty-two seconds after spray application, the fabric with its covering of fluid emulsion is drawn through a metering device consisting of a leveling bar mounted over a roller fabric support and adjusted to a clearance which allows a wet emulsion thickness of 0.029 inch to pass under the leveling bar. A rolling bank of about 1.5 inches diameter is maintained on the entry side of the leveling bar at all times. About 110 seconds after this metering with the leveling bar, the emulsion coated fabric is passed into a radiant heating zone comprising ten electrical resistance heating units, each 6 feet long and rated at 3000 watts, the heating units being disposed at right angles to the direction of web travel and in a horizontal plane about 20 inches above the coated fabric. The distance between individual heaters is about one foot, and each is provided with an efficient reflector to direct the bulk of its radiant energy downwardly.

While passing through this radiant heating zone, the emulsion expands to a foam about 0.25 inch thick. From the radiant heat zone the fabric continues through a steam heated convection oven with air temperature of about 250° F. for a period of 33 minutes to dry and cure the foam. As the fabric emerges from this oven it is wound into rolls for storage. The foam layer is integrally bonded to the fabric and has a density of about 4.6 lbs. per in. ft. The exposed surface of the foam is a tough, flexible, porous, abrasion-resistant skin.

By varying the thickness of the wet emulsion film deposited on the cloth, the thickness of the foam layer may be correspondingly varied. By the procedure of this example, except that feed rates and leveling bar setting were varied, we have coated cloth with foam layers as thin as ⅛ inch and as thick as one inch.

In addition to treating uncoated cloth by this process, we have produced foam coatings on the uncoated side of vinyl coated cloth.

Example 62
FLOCKING

A flocked foam is prepared by sifting $\frac{1}{16}$" fibers of rayon on to the surface of a foam-covered fabric as in Example 61 when the foam has just reached its full expansion.

If desired, the flock may be sifted on to the wet emulsion film before expansion has become appreciable, during expansion, or after expansion while the surface skin is still tacky.

What is claimed is:

1. A process of producing a polyurethane foam which comprises intimately admixing (1) a water immiscible prepolymer prepared by interaction of at least one hydrophobic polyhydroxyl compound with a stoichiometric excess of a polyisocyanate substance and (2) an amount of a water phase equal in weight to at least ¼ the weight of said prepolymer, said water phase containing solutes which transform the water phase into a viscous aqueous solution having substantial yield value, and thereafter effecting chemical reaction of the components of the resulting mixture to form a polyurethane foam.

2. A process of producing a polyurethane foam which comprises intimately admixing (1) a water immiscible prepolymer prepared by interaction of a hydrophobic polyhydroxyl substance with a stoichiometric excess of a polyisocyanate substance, said prepolymer containing between about 5% and about 20% available isocyanate radicals by weight with (2) a substantially equal weight of a suitably thickened water phase, and thereafter effecting chemical reaction of the components of the resulting mixture to form a polyurethane foam.

3. A method of forming a layer of polyurethane foam on a substrate which comprises forming an intimate admixture of (1) a foamable hydrophobic prepolymer containing between 5 and 20% by weight of available isocyanate radicals and (2) a suitably thickened water phase amounting to at least ¼ the weight of said prepolymer, applying said intimate admixture to a substrate, and subjecting said substrate bearing a liquid film of said mixture to baking, whereby a polyurethane foam having a thickness substantially proportioned to the thickness of said liquid film is produced.

4. A process according to claim 3 in which the liquid film is leveled uniformly by a doctor blade before foaming and curing.

5. A process of producing a flocked layer of polyurethane foam comprising (1) preparing an intimate admixture of a hydrophobic isocyanate-containig prepolymer and at least ¼ its weight of a suitably thickened water phase, (2) distributing the resulting emulsion over the surface of a substrate, (3) heating the wet emulsion film to cause it to expand to a foam, and (4) applying short lengths of filament material to the resulting foam before it ceases to be tacky.

References Cited in the file of this patent

UNITED STATES PATENTS

| | | |
|---|---|---|
| 2,663,097 | Giese | Dec. 22, 1953 |
| 2,726,219 | Hill | Dec. 6, 1955 |
| 2,770,241 | Winkler | Nov. 13, 1956 |
| 2,779,689 | Reis | Jan. 29, 1957 |
| 2,784,630 | Koprow et al. | Mar. 12, 1957 |
| 2,787,601 | Detrick | Apr. 2, 1957 |
| 2,816,741 | Schuffman | Dec. 17, 1957 |
| 2,841,205 | Bird | July 1, 1958 |
| 2,842,506 | Roussel | July 8, 1958 |
| 2,850,464 | Mitchell | Sept. 2, 1958 |
| 2,866,722 | Gensel | Dec. 30, 1958 |
| 2,877,193 | Roussel | May 10, 1959 |